United States Patent
Kauffman

(10) Patent No.: US 8,857,762 B2
(45) Date of Patent: Oct. 14, 2014

(54) METHOD AND APPARATUS FOR ESTABLISHING AN ENVIRONMENTALLY ISOLATED VOLUME

(71) Applicant: The Boeing Company, Chicago, IL (US)

(72) Inventor: Brad A. Kauffman, Tulalip, WA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 13/781,004

(22) Filed: Feb. 28, 2013

(65) Prior Publication Data

US 2013/0340954 A1    Dec. 26, 2013

Related U.S. Application Data

(60) Provisional application No. 61/663,989, filed on Jun. 25, 2012.

(51) Int. Cl.
| | |
|---|---|
| *B64C 1/22* | (2006.01) |
| *B64C 1/40* | (2006.01) |
| *B64C 1/06* | (2006.01) |
| *B64C 1/00* | (2006.01) |
| *E06B 5/16* | (2006.01) |
| *B64D 45/00* | (2006.01) |

(52) U.S. Cl.
CPC . *E06B 5/16* (2013.01); *B64C 1/406* (2013.01); *B64C 1/069* (2013.01); *B64C 1/00* (2013.01); *B64D 45/00* (2013.01)
USPC .............. 244/118.1; 244/118.5; 160/9; 52/63

(58) Field of Classification Search
USPC ............. 244/118.1, 118.5, 129.4, 129.5, 121; 160/9, 329, 354, 368.1; 52/63, 83; 49/31; 24/115 F; 220/1.5; 410/118; 292/92
See application file for complete search history.

(56) References Cited

U.S. PATENT DOCUMENTS

| | | | |
|---|---|---|---|
| 2,605,064 A * | 7/1952 | Davis ............................ 410/104 |
| 3,294,034 A * | 12/1966 | Bodenheimer et al. ........... 410/1 |
| 3,872,634 A * | 3/1975 | Seaman .......................... 52/222 |
| 4,290,243 A * | 9/1981 | Mellin .............................. 52/63 |
| 4,429,730 A * | 2/1984 | Elston ........................ 160/368.1 |
| 4,538,663 A * | 9/1985 | Looker ....................... 160/368.1 |
| 4,601,405 A * | 7/1986 | Riemer .......................... 220/1.5 |
| 5,765,883 A | 6/1998 | Dessenberger et al. |
| 6,863,980 B2 | 3/2005 | Misciagna et al. |
| 7,530,529 B2 * | 5/2009 | Bock .......................... 244/118.5 |

* cited by examiner

Primary Examiner — David Purol
(74) Attorney, Agent, or Firm — Alston & Bird LLP

(57) ABSTRACT

A method and apparatus are provided for at least partially environmentally isolating a volume, such as by environmentally isolating the cargo compartment from the passenger compartment of an aircraft. In the context of an apparatus, a barrier curtain is provided that partially defines the volume. The apparatus also includes a cable extending along one or more walls that partially define the volume. The barrier curtain is supported by the cable. The apparatus may also include a cable release mechanism attached to a respective wall. The cable is carried by the cable release mechanism and the cable release mechanism is configured to fail at a predetermined load, thereby permitting the barrier curtain to drop in response to a decompression event.

20 Claims, 8 Drawing Sheets

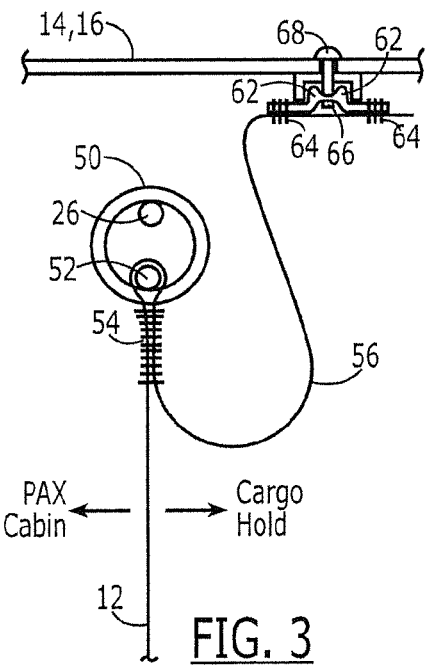
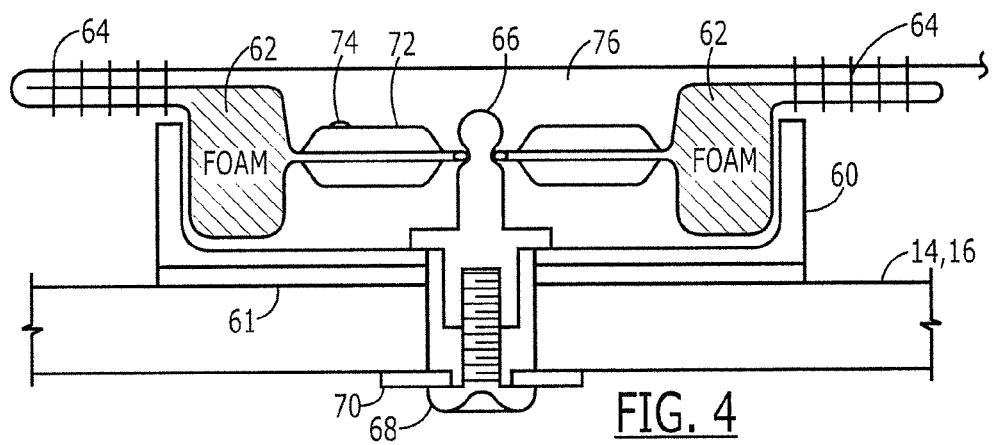
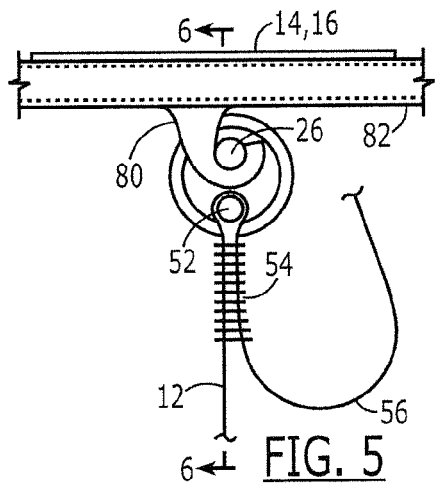
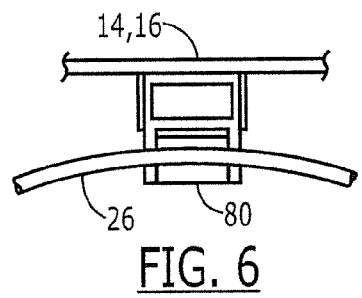

METHOD AND APPARATUS FOR ESTABLISHING AN ENVIRONMENTALLY ISOLATED VOLUME

CROSS-REFERENCE TO RELATED APPLICATIONS

The present application claims priority from U.S. Provisional Patent Application No. 61/663,989 filed Jun. 25, 2012, the contents of which are incorporated herein in their entirety.

TECHNOLOGICAL FIELD

An embodiment of the present disclosure relates generally to a method and an apparatus for establishing an environmentally isolated volume and, more particularly, to a method and apparatus for establishing an environmentally isolated volume so as to provide for flame, smoke or other particulate isolation while also being responsive to pressure variations including an explosive decompression.

BACKGROUND

It may be desirable to environmentally isolate various spaces from one another in order to provide for flame, smoke or other particulate isolation. For example, within an aircraft fuselage, the passenger compartment may be environmentally isolated from the cargo compartment so as to provide smoke or flame isolation, thereby reducing smoke or flame dispersion within the fuselage of the aircraft. Within an aircraft, the environmental isolation of the passenger compartment from the cargo compartment may be complicated by the cabin pressure differences between the passenger compartment and the cargo compartment. In this regard, some aircraft include a frame or other structural member positioned between the cargo compartment and the passenger compartment for supporting a barrier that extends between the compartments. As the frame or other structural members must be capable of carrying the loads created by the differential pressure between the passenger compartment and the cargo compartment under normal operating conditions, the frame or other structural members may be structurally substantial, thereby adding to the cost and weight of the aircraft.

In addition to compensating for pressure variations between the passenger compartment and the cargo compartment, environmental isolation techniques must also account for rapid decompression events and, as such, aircraft may include integral decompression panels. The pressure differential at which the integral decompression panels are caused to open may be dependent on friction which may, in turn, vary over time and from installation to installation, such as in response to material properties, dirt, debris or the like.

BRIEF SUMMARY

A method and apparatus are provided for at least partially environmentally isolating a volume, such as by environmentally isolating the cargo compartment from the passenger compartment of an aircraft. By environmentally isolating the volume, the method and apparatus of an example embodiment of the present disclosure provide for smoke or flame isolation, thereby limiting or preventing smoke or flame dispersion. The method and apparatus are also configured to environmentally isolate the volume in a manner that compensates for pressure variations, such as pressure variations between the cargo compartment and the passenger compartment of an aircraft in a manner that does not require a substantial perimeter frame or other structural members to support and transfer the differential pressure loads that may exist under normal operating conditions. Additionally, the method and apparatus of an embodiment of the present disclosure accommodate decompression events and, in one embodiment, accommodate explosive decompression events without requiring decompression panels.

In one embodiment, an apparatus for at least partially environmentally isolating a volume is provided. The apparatus includes a barrier curtain that partially defines the volume. The apparatus also includes a first cable extending along one or more walls or a ceiling that partially define the volume. The barrier curtain is supported by the first cable. The apparatus of this embodiment also includes a cable release mechanism attached to the barrier curtain and configured to engage the first cable. The cable release mechanism of this embodiment includes a diaphragm configured to be deflected in response to a pressure differential being placed upon the barrier curtain. Thus, the cable release mechanism of this embodiment releases the first cable in response to at least a predetermined pressure differential being placed upon the barrier curtain.

The cable release mechanism of one embodiment also includes a lever operably connected to the diaphragm for movement therewith and a capture block responsive to the lever. The capture block is configured to be held in an engagement position by the lever so as to engage the first cable in an instance in which less than the predetermined pressure differential has been placed upon the barrier curtain. The capture block of this embodiment is permitted to release the first cable in an instance in which the lever has moved in response to at least the predetermined pressure differential being placed upon the barrier curtain.

The first cable of one embodiment includes first and second portions with the capture block being configured to engage the first and second portions of the first cable. The first and second portions of the first cable may be under tension. In this embodiment, each of the first and second portions of the first cable may include a cable fitting having an angled exterior surface. The capture block may define correspondingly angled surfaces configured to engage the angled exterior services of the cable fittings of the first and second portions of the first cable while the capture block is held in the engagement position.

The cable release mechanism of one embodiment may also include a plate attached to the barrier curtain with the lever being pivotably connected to the plate. The cable release mechanism of one embodiment may also include an engagement mechanism configured to engage the lever and to prevent movement in the lever until at least a predetermined pressure differential has been placed upon the barrier curtain. In this regard, the lever may define a recess and the engagement mechanism may include a ball detent configured to engage the recess and to prevent movement of the lever until at least the predetermined pressure differential has been placed upon the barrier curtain. The diaphragm may include a flexible portion configured to be deflectable in response to pressure differential being placed upon the barrier curtain.

In another embodiment, a cable release mechanism is provided that includes a plate configured to be attached to a barrier curtain that is supported, by a first cable, relative to one or more walls that at least partially define a volume. The cable release mechanism of this embodiment also includes a diaphragm carried by the plate and configured to be deflectable in response to a pressure differential being placed upon the barrier curtain. The cable release mechanism of this embodiment also includes a lever operably connected to the diaphragm for movement therewith and a capture block responsive to the lever. The capture block is configured to be held in an engagement position by the lever so as to engage the first cable in an instance in which less than a predetermined pressure differential has been placed upon the barrier curtain. The capture block is also permitted to release the first cable in an instance in which the lever is moved in response to at least the predetermined pressure differential being placed upon the barrier curtain.

The first cable may include first and second portions. As such, the capture block may be configured to engage the first and second portions of the first cable. The first and second portions of the first cable may be under tension. In this regard, each of the first and second portions of the first cable may include a cable fitting having an angled exterior surface. The capture block of this embodiment also defines correspondingly angled surfaces configured to engage the angled exterior surfaces of the cable fittings of the first and second portions of the first cable while the capture block is held in the engagement position.

The lever may be pivotably connected to the plate. The cable release mechanism of one embodiment may also include an engagement mechanism configured to engage the lever and to prevent movement of the lever until at least the predetermined pressure differential has been placed upon the barrier curtain. In one embodiment, the lever may define a recess and the engagement mechanism may include a ball detent configured to engage the recess and to prevent movement of the lever until at least a predetermined pressure differential has been placed upon the barrier curtain. The diaphragm of one embodiment may include a flexible portion configured to be deflectable in response to a pressure differential being placed upon the barrier curtain. The lever of one embodiment may also include a roller configured to contact the capture block while the capture block is held in the engagement position.

In a further embodiment, a method for at least partially environmentally isolating a volume is provided that includes releasably attaching a first cable to one or more walls that partially define the volume. The method also supports a barrier curtain that partially defines the volume with the first cable. The method of this embodiment also engages the first cable with a cable release mechanism that is attached to the barrier curtain and that includes a diaphragm. In this embodiment, the method also causes the cable release mechanism to release the first cable in response to deflection of the diaphragm occasioned by at least a predetermined pressure differential being placed upon the barrier curtain.

In an embodiment in which the cable release mechanism further includes a lever operably connected to the diaphragm for movement therewith and a capture block responsive to the lever, the engagement of the first cable with the cable release mechanism may include engaging the first cable with the capture block in an instance in which less than the predetermined pressure differential has been placed upon the barrier curtain. In this embodiment, causing the cable release mechanism to release the first cable may also include permitting the capture block to release the first cable in an instance in which the lever has moved in response to at least the predetermined pressure differential being placed upon the barrier curtain. The first cable may include first and second portions. As such, the first cable may be engaged with a capture block by engaging the first and second portions of the first cable with the capture block. In one embodiment, the method may also include preventing movement of the lever until at least the predetermined pressure differential has been placed upon the barrier curtain.

BRIEF DESCRIPTION OF THE SEVERAL VIEWS OF THE DRAWINGS

Figure 1:
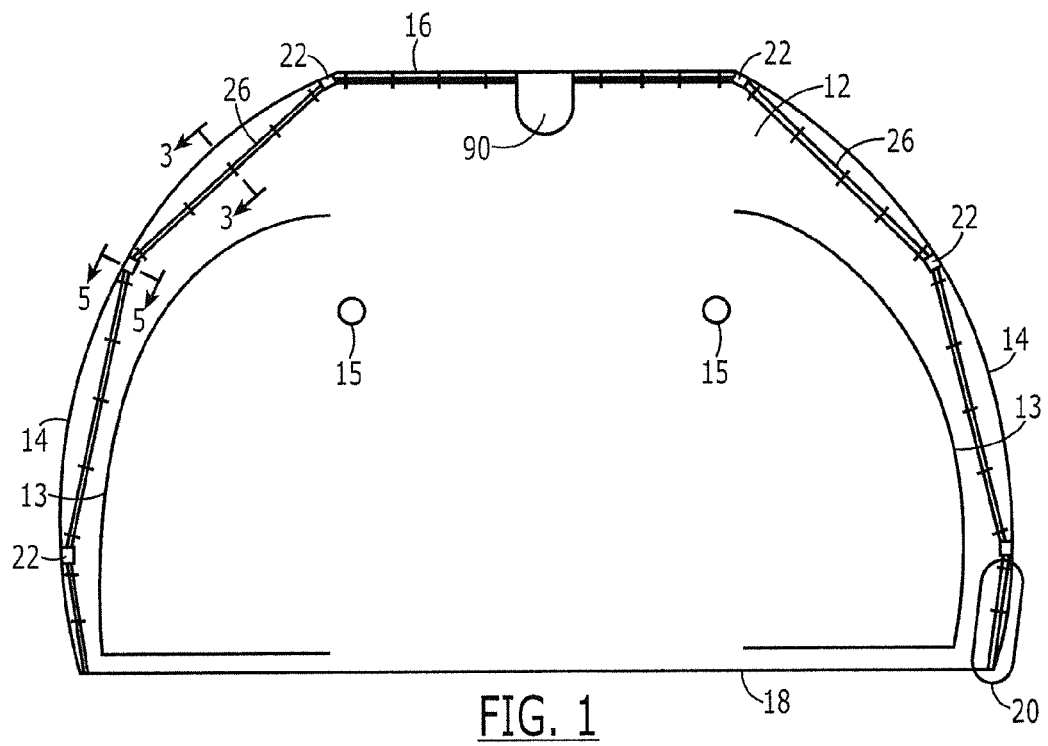
Figure 2:
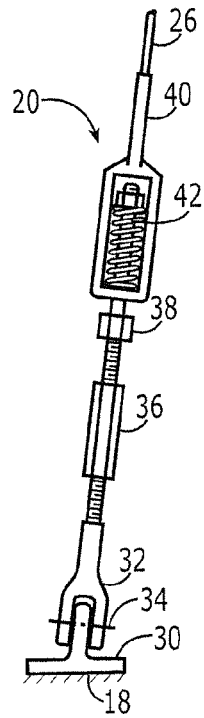
Figure 7:
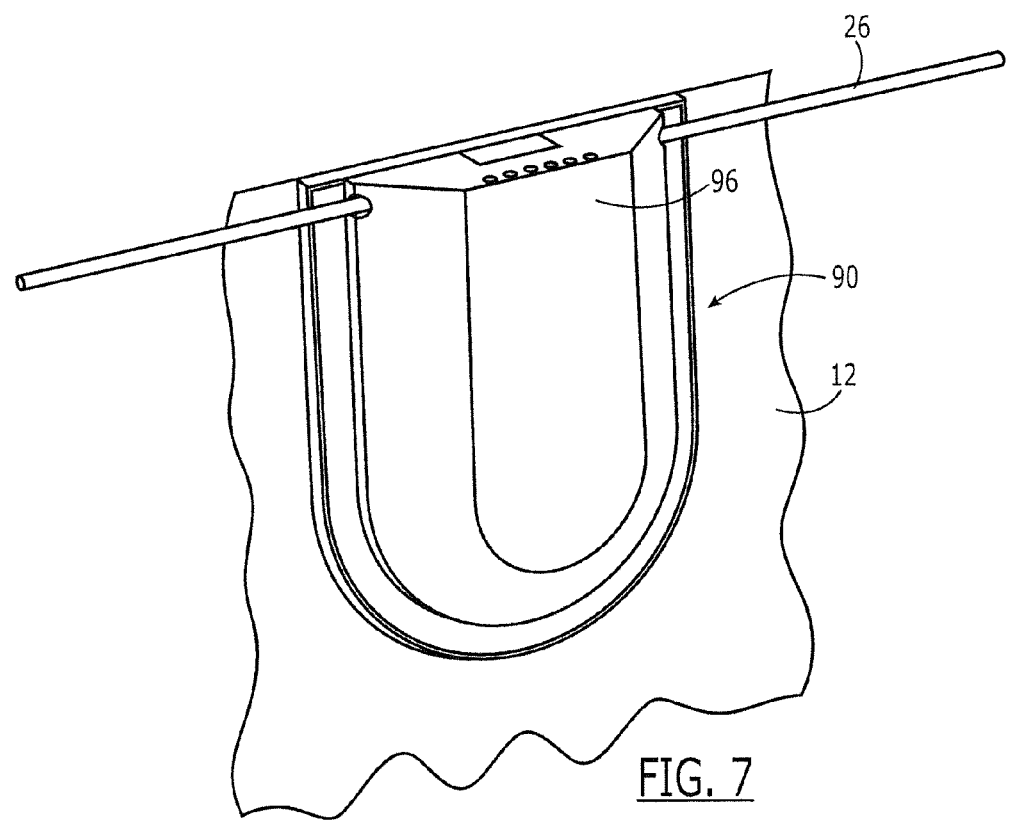
Figure 8:
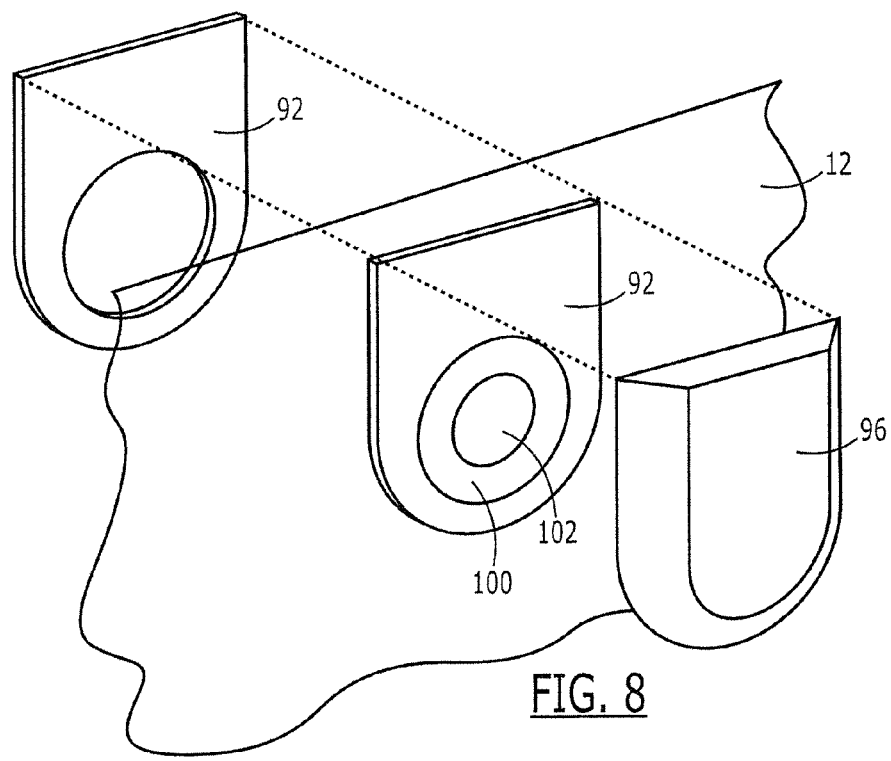
Figure 9:
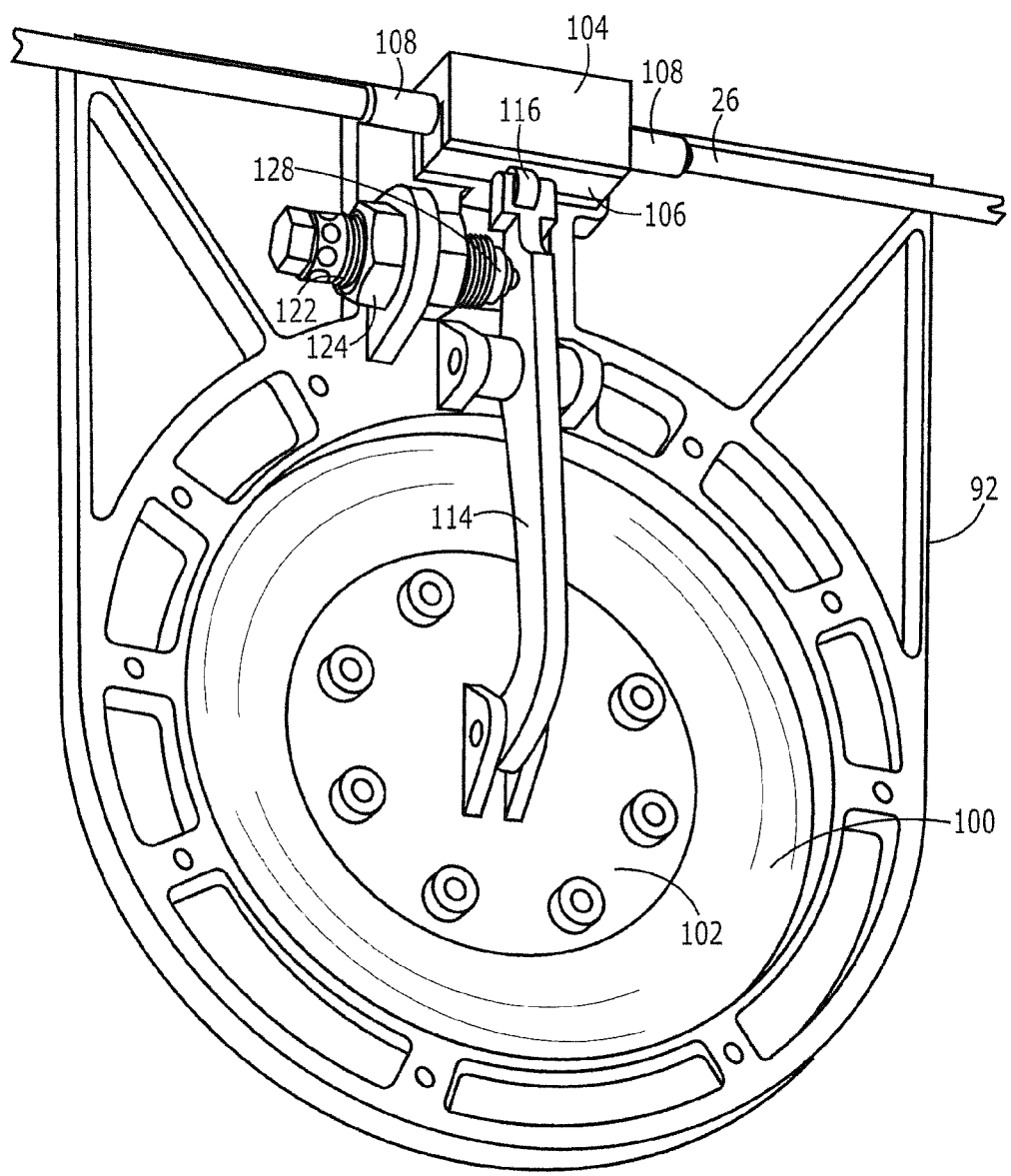
Figure 10:
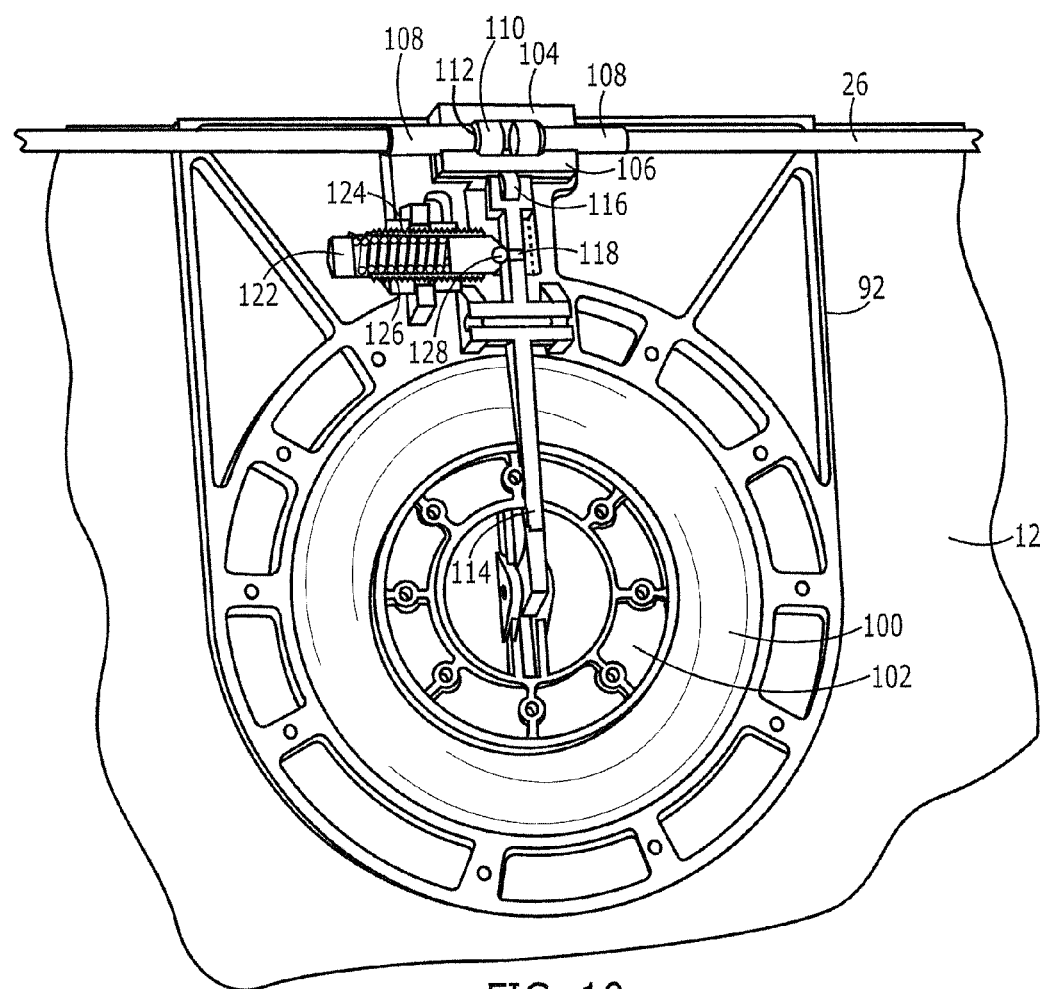
Figure 11:
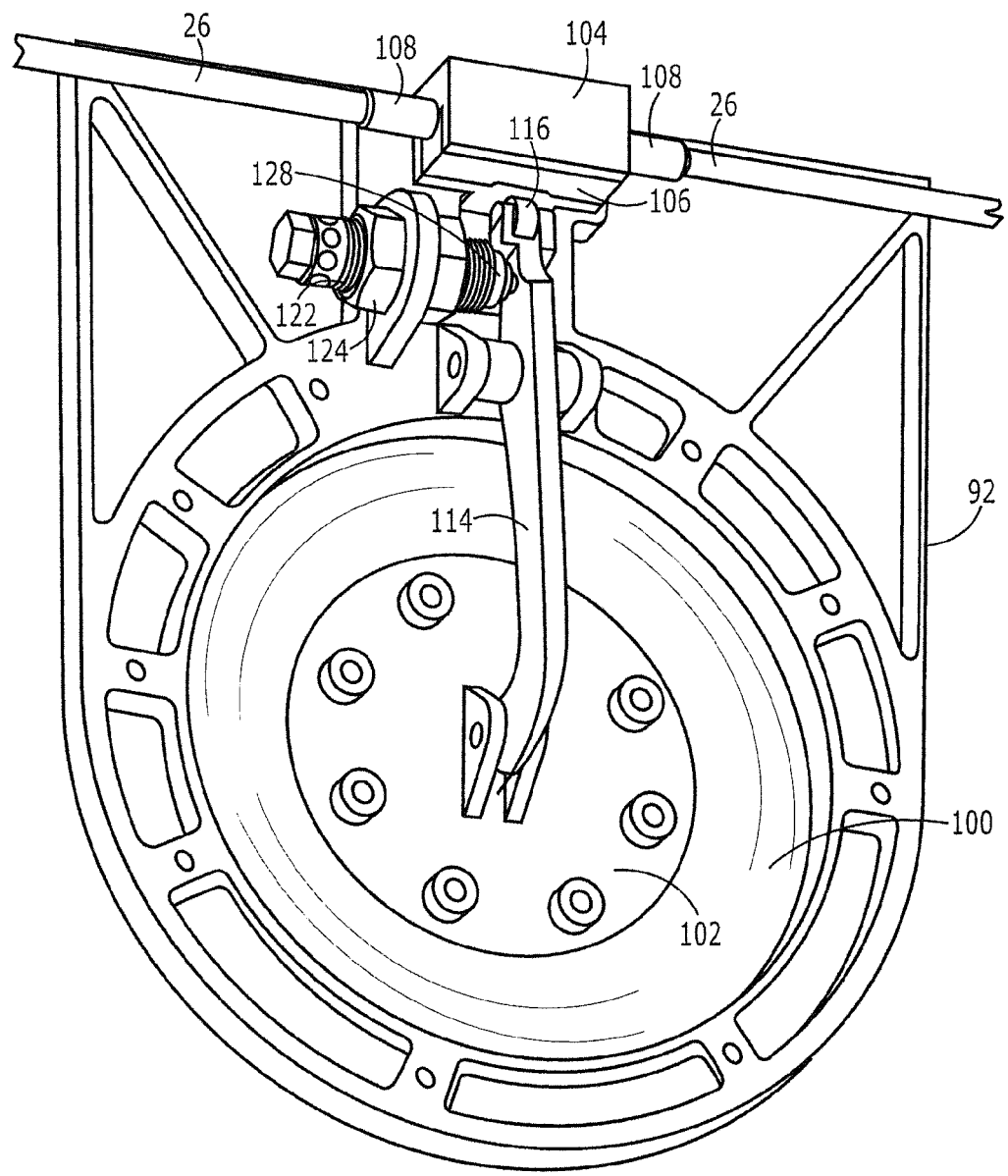
Figure 12:
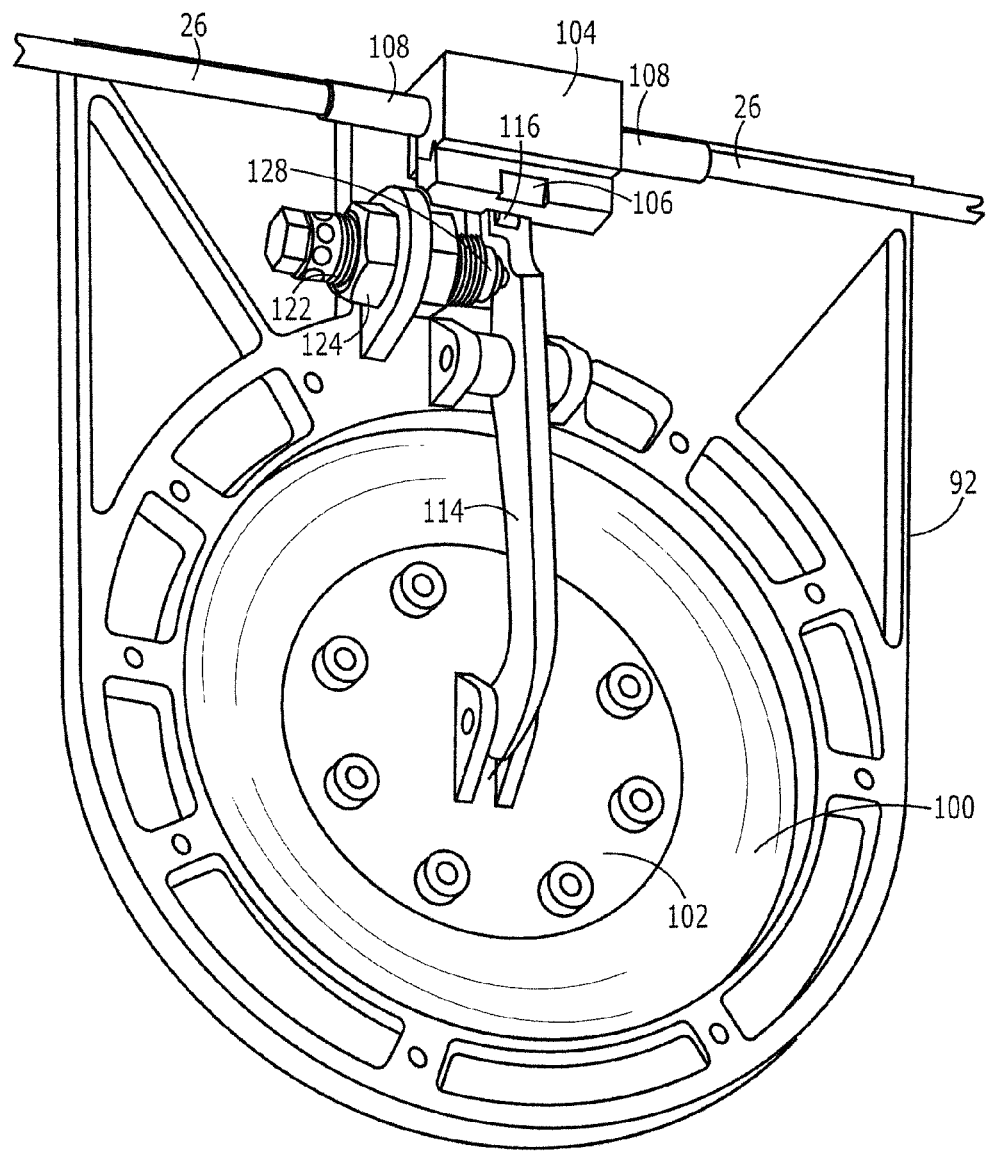
Figure 13:
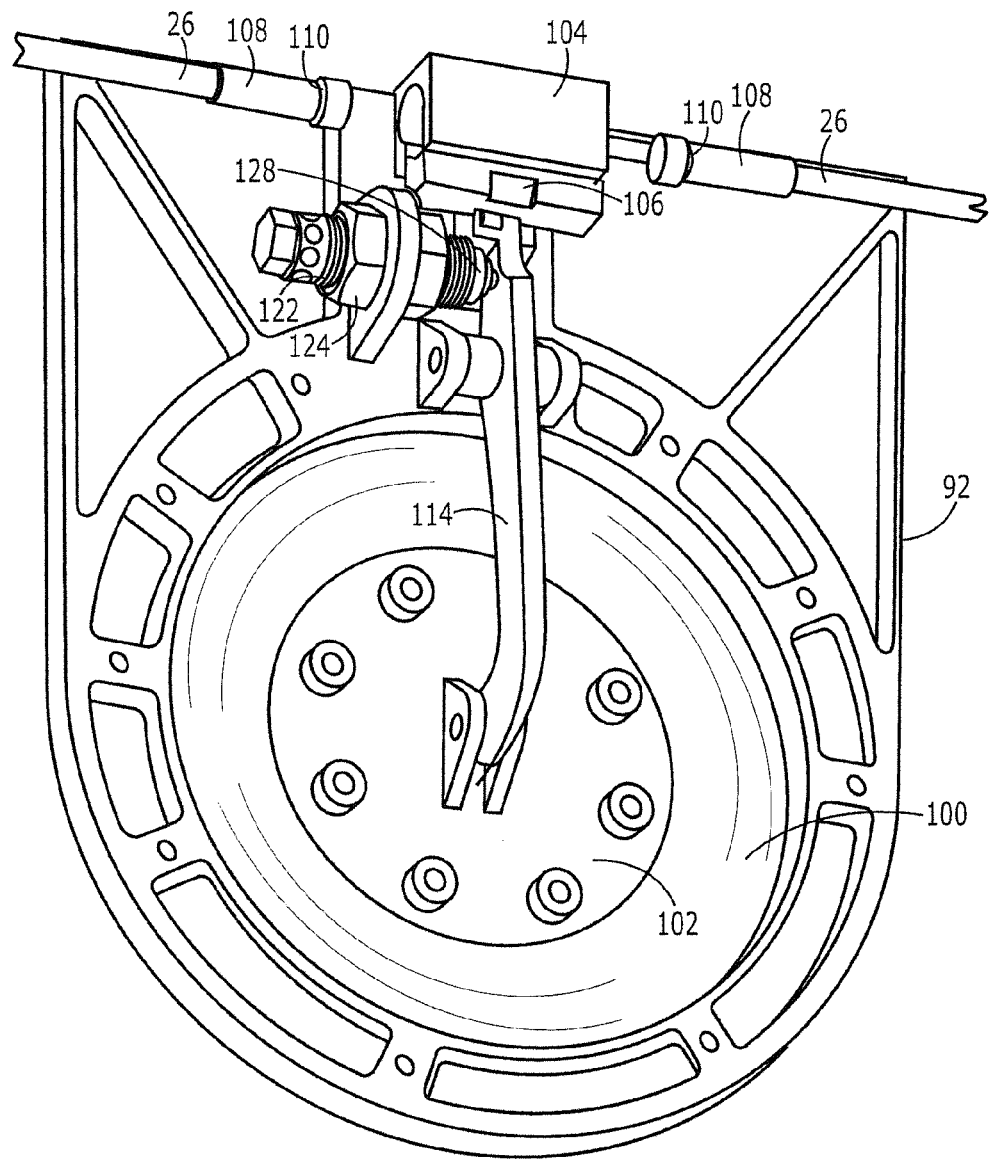

Having thus described certain embodiments of the present disclosure in general terms, reference will now be made to the accompanying drawings, which are not necessarily drawn to scale, and wherein:

FIG. 1 is a view from the passenger compartment toward the cargo compartment that illustrates the barrier positioned therebetween in accordance with one embodiment of the present disclosure;

FIG. 2 illustrates a mechanism for attaching a cable to the airframe in accordance with one embodiment of the present disclosure;

FIG. 3 is a cross-sectional view taken along line 3-3 of FIG. 1 illustrating the attachment of the barrier curtain to a sidewall;

FIG. 4 is a more detailed representation of a seal for attaching the barrier curtain to a sidewall in accordance with one embodiment of the present disclosure;

FIG. 5 is a cross-sectional view taken along line 5-5 of FIG. 1 illustrating the attachment of the cable to the sidewall;

FIG. 6 is a cross-sectional view taken along line 6-6 of FIG. 5 which illustrates a hook attached to the sidewall and configured to carry the cable;

FIG. 7 is a perspective view of the cable release mechanism in accordance with one embodiment of the present disclosure;

FIG. 8 is an exploded perspective view of the cable release mechanism of FIG. 7;

FIG. 9 is a perspective view of the cable release mechanism while in the engagement position and with the cover having been removed in accordance with one embodiment of the present disclosure;

FIG. 10 is a cross-sectional view of the cable release mechanism of FIG. 9;

FIG. 11 is a perspective view of the cable release mechanism of FIG. 9 following movement of the lever in response to deflection of the diaphragm in accordance with one embodiment of the present disclosure;

FIG. 12 is a perspective view of the cable release mechanism of FIG. 9 depicting disengagement of the capture block from the cable in accordance with one embodiment of the present disclosure; and FIG. 13 is a perspective view of the cable release mechanism of FIG. 9 following release of the cable in accordance with one embodiment of the present disclosure.

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth; rather, these embodiments are provided so that this disclosure will be thorough and complete, and will fully convey the scope of the disclosure to those skilled in the art. Like numbers refer to like elements throughout.

In a number of situations, it may be desirable to environmentally isolate one volume from an adjacent volume, such as for smoke or flame isolation, thereby limiting or preventing smoke or flame dispersion between the volumes. For example, an aircraft may include various compartments that may be environmentally isolated from one another, such as the environmental isolation between the passenger compartment and the cargo compartment on board an aircraft, thereby limiting or preventing smoke and/or flame dispersion throughout the aircraft. A method and apparatus of one embodiment of the present disclosure will be hereinafter described in conjunction with the environmental separation between the passenger compartment and the cargo compartment on board an aircraft. However, the method and apparatus of other embodiments of the present disclosure may be deployed in other situations, either on board an aircraft or elsewhere, in order to environmentally isolate other volumes.

Referring now to FIG. 1, an apparatus for at least partially environmentally isolating a volume, such as for environmentally isolating the passenger compartment from the cargo compartment of an aircraft, is illustrated. As shown, the apparatus may include a barrier curtain 12, which in combination with the walls of the aircraft including the sidewalls 14, the ceiling panels 16 and the floor 18, define the volume, such as the cargo compartment, that is to be environmentally isolated. The barrier curtain 12 may be formed of various materials including fire and smoke resistant materials, such as neoprene impregnated fiberglass material. The barrier curtain 12 extends between the side walls 14 and from the ceiling panels 16 to the floor 18 so as to separate the cargo compartment from the passenger compartment.

In accordance with an embodiment of the present disclosure, the apparatus also includes a first cable 26 that extends along one or more walls, such as one or more of the side walls 14 and the ceiling 16, and the barrier curtain 12 is, in turn, supported by the first cable. In some embodiments, the volume that is to be environmentally isolated, such as the cargo compartment, is open at two opposed ends in the absence of the barrier curtain 12. For example, a cargo compartment may be positioned in the midsection of an aircraft and, as such, it may be desirable to environmentally isolate the cargo compartment from passenger compartments both forward and rearward of the cargo compartment. As such, a barrier curtain 12 may be installed at each of the two opposed ends of the volume. Thus, while FIG. 1 illustrates the barrier curtain 12 positioned at one end of the volume, a comparable barrier curtain may be positioned at the other end of the volume.

As shown in FIG. 1, the barrier curtain 12 may include one or more zippers 13. Once the zippers 13 are unzipped, a person may pass through the barrier curtain 12, thereby permitting movement between the passenger compartment and the cargo compartment. In order to provide for the environmental isolation, however, the zippers 13 are generally zipped closed. In one embodiment, the barrier curtain 12 also includes a viewport 15, such as a glass viewport that is sealed about its periphery, thereby allowing a person in one compartment to look into the adjacent compartment without compromising the environmental isolation.

As noted above, the barrier curtain 12 is supported by a first cable 26. The first cable 26 extends along and is attached to one or more of the walls that define the volume. In the illustrated embodiment, the opposite ends of the first cable 26 are attached to the floor 18. While the first cable 26 may be attached to the floor 18 in various manners, FIG. 2 illustrates one attachment mechanism 20 for attaching a respective end of the first cable 26 to the floor 18. In this regard, a lug fitting 30 may be mounted to the floor and the attachment mechanism 20 may include a clevis fitting 32 that is rotatably attached to the lug fitting, such as with a pin 34. The attachment of the end of the first cable 26 to the floor 18 may also include a turnbuckle 36 and a hexagonal fitting 38 for providing adjustability in tensioning of the first cable. The attachment mechanism 20 may also include a swage link 40 that is mechanically connected to the first cable 26. As shown in FIG. 2, the attachment mechanism 20 may also include a tensioner compression spring 42 disposed within a cavity defined by the swage link 40. The tensioner compression spring 42 is configured to allow a limited degree of lengthening of the first cable 26, such as 0.3 inches in one embodiment, so as to accommodate thermal expansion and pressurization variations. In one embodiment, a similar attachment mechanism 20 may also affix the other end of the first cable 26 to the floor 18, such as on the opposite side of the aircraft, in order to provide additional lengthening of the first cable, such as 0.6 inches in one embodiment.

As a result of the arcuate or other complex shape of the side walls 14, the first cable 26 may be attached to the side walls at a plurality of discrete locations designated as 22 as will be described below. Between the discrete locations at which the first cable 26 is attached to the side walls 14, the first cable may be spaced apart from the side wall by a distance. In order to provide for the environmental isolation between the volumes, the barrier curtain 12 may be attached to the side walls 14 in those regions in which the first cable 26 is spaced from the side wall. Although the barrier curtain 12 may be attached to the side walls 14 in various manners, FIG. 3 illustrates a cross-sectional view taken along line 3-3 of FIG. 1 of one technique for attaching the barrier curtain to a side wall.

As shown in FIG. 3, the first cable 26 may extend through a ring 50. As also shown in FIG. 3, the barrier curtain 12 is attached to a second cable 52 that also extends through the same ring 50. In this regard, FIG. 1 illustrates the first and second cables 26, 52 as well as the rings 50 through which the cables extend with the rings depicted as hash marks extending across each of the first and second cables. The barrier curtain 12 may be attached to the second cable 52 in various manners, but, in one embodiment, the barrier curtain includes a plurality of reinforced eyelets through which the rings 50 extend with the barrier curtain then being wrapped about the second cable with the overlapping portions of the barrier curtain being stitched together as shown at 54 of FIG. 3. The first and second cables 26, 52 may, in one embodiment, be the same type of cable, such as a nylon coated, stainless steel cable.

In order to provide for environmental isolation between the adjacent volumes, the barrier curtain 12, such as an edge of the barrier curtain, may extend beyond the second cable 52 and may be attached to a side wall 14 or ceiling panel 16. The edge of the barrier curtain 12 may be attached to a side wall 14 or ceiling panel 16 in various manners including, in one embodiment as shown in FIG. 3 and, in more detail, in FIG. 4, with a seal. In this regard, the seal may include a channel 60, such as a fiberglass channel, that is attached to the side wall 14 or ceiling panel 16 with, for example, double-back foam tape 61. The seal may also include foam portions 62 to which the edge of the barrier curtain 12 is stitched as shown at 64. The foam portions 62 may, in turn, be secured within the channel 60 by a fastener, such as a lift-the-dot fastener. As shown in FIG. 4, for example, the lift-the-dot fastener may include a lift-the-dot stud 66 that is attached to the side wall 14 or ceiling panel 16 with a screw 68 and washer 70 and that engages a lift-the-dot grommet 72 having a dot 74 disposed within the channel 60 and secured to the foam portions 62. As such, the edge of the barrier curtain 12 may be attached to the foam portions 62, such as by stitching 64, with the foam portions, in turn, secured to the lift-the-dot grommet 72 with the resulting assembly then being snapped into engagement with the lift-the-dot stud 66 so as to secure the edge of the barrier curtain to a side wall or a ceiling panel in order to provide for the environmental isolation. In one embodiment, a reinforcement material 76, such as Kevlar material, may be attached to the barrier curtain 12 so as to avoid abrasion or puncturing of the barrier curtain by the lift-to-dot fastener.

As shown in FIG. 3, the portion of the barrier curtain 12 between the second cable 52 and the seal may include a slack region 56 to accommodate some flexure of the barrier curtain and the first and second cables without disturbing the seal between the edge of the barrier curtain and the side wall 14 or ceiling panel 16. Although one seal is illustrated and described above, the apparatus of one embodiment may include a plurality of seals positioned along the side walls 14 and/or ceiling panels 14 in those regions in which the first cable 26 is spaced from the side wall or ceiling panel.

As also illustrated in FIG. 1, the first cable 26 is attached to the side wall 14 and/or ceiling panels 16 at a number of different positions. Although the first cable 26 may be attached to the side walls 14 and/or ceiling panels 16 in various manners, one mechanism for attaching the first cable to a side wall or ceiling panel is shown, for example, in FIGS. 5 and 6. In this regard, a hook 80 may be attached to the side wall 14 or ceiling panel 16 and the first cable 26 may be engaged by the hook so as to be held proximate the side wall or ceiling panel. In this regard, the hook 80 may include or otherwise be carried by a support bracket 82 that extends lengthwise so as to attached to the frame. As shown in FIG. 5 and as described above, the first and second cables 26, 52 may both extend through a plurality of rings 50 and the edge of barrier curtain 12 may be attached to the side wall 14 and/or ceiling panels 16 in the manner described above in conjunction with FIGS. 3 and 4 so as to provide for the environmental isolation. Although one mechanism for attaching the first cable 26 to a side wall 14 or ceiling panel 16 is shown in FIGS. 5 and 6 and described above, other mechanisms may be employed including mechanisms that employ clamps or other fasteners instead of hooks 80.

As described above, the barrier curtain 12 provides for environmental isolation between the adjacent volumes, such as between a passenger compartment and a cargo compartment, thereby reducing or preventing smoke and flame dispersion between the adjacent compartments. As a result of the construction of the barrier curtain 12 and the first and second cables 26, 52, as well as the attachment of the opposed ends of the first cable via a tensionor compression spring 42, the barrier curtain 12 is able to accommodate the pressure differential that is anticipated to exist from time to time between the passenger compartment and the cargo compartment during normal operating conditions. However, in some situations, there may be a rapid and substantial differential in pressure between the adjacent volumes, such as between the passenger compartment and the cargo compartment, such as in conjunction with a rapid decompression event, e.g., an explosive decompression. In this situation, the apparatus including a cable release mechanism 90 is configured to release the barrier curtain 12 such that the barrier curtain no longer separates the adjacent volume and, in one embodiment, may drop to the floor so as to permit the volumes to be equally pressurized.

Although the cable release mechanism 90 may be configured in various manners, the cable release mechanism of one embodiment is shown in FIG. 7. The cable release mechanism 90 is attached to the barrier curtain 12, such as along or otherwise proximate an edge of the barrier curtain. While the cable release mechanism 90 may be attached to various portions of the barrier curtain 12, the cable release mechanism of one embodiment is attached to an upper portion of the barrier curtain, such as along an upper edge of the barrier curtain. In the illustrated embodiment, for example, the cable release mechanism 90 is attached to the barrier curtain 12 along an upper edge at a position intermediate, e.g., between, the opposed side walls 14.

Although the cable release mechanism 90 may be attached to the barrier curtain 12 in various manners, the cable release mechanism of one embodiment is shown in an exploded perspective view in FIG. 8 to include first and second plates 92, 94 positioned on opposite sides of the barrier curtain and in alignment with one another. As will be understood with reference to FIGS. 9-13 described below, the cable release mechanism 90 of the exploded perspective view of FIG. 8 only includes a simplified representation of the first and second plates 92, 94 and not other components of the cable release mechanism. The cable release mechanism 90 of this embodiment may include a plurality of fasteners that extend through corresponding apertures defined by the first and second plates 92, 94 and through the barrier curtain 12 that is positioned therebetween so as to engage the first and second plates and to secure the first and second plates of the cable release mechanism to opposite surfaces of the barrier curtain. As shown in the exploded perspective view of FIG. 8, the cable release mechanism 90 may also include a cover 96 that may be removably attached to at least one of the plates, such as the first plate 92 in the illustrated embodiment. However, for purposes of illustration, the cable release mechanism 90 of one embodiment that is depicted in FIGS. 9-13 and described below has the cover removed.

In this regard, the cable release mechanism 90 of one embodiment is illustrated in FIG. 9 and, in cross section in FIG. 10 in a position in which the cable release mechanism engages the first cable 26. As illustrated, the cable release mechanism 90 of this embodiment includes a diaphragm 100 that is configured to be deflectable in response to a pressure differential being placed upon the barrier curtain 12, that is, in response to a difference in pressure between the opposite sides of the barrier curtain. In this regard, the first and second plates 92, 94 that are attached to the opposite sides of the barrier curtain 12 may each define openings that are aligned with one another. The diaphragm 100 of the cable release mechanism 90 may be disposed within the aligned openings and may be attached, such as along the outer or circumferential edge, to the first plate 92. Although the diaphragm 100 may be constructed in various manners, the diaphragm of the illustrated embodiment includes a bellows formed of a flexible material, such as a silicone rubber material, or a loose material, such as a fabric, having sufficient excess material to accommodate movement, that is configured to move with the barrier curtain 12 as the barrier curtain is deflected by a pressure differential or otherwise. While the entire diaphragm 100 may be formed of a bellows, the diaphragm of the illustrated embodiment includes a medial pressure plate 102 that is formed of a rigid material, such as a metal. Thus, the bellows of the diaphragm 100 of the illustrated embodiment defines an annular region between the first plate 92 and the medial pressure plate 102 with the bellows being attached along its outer edge or circumference to the first plate and along its inner edge or circumference to the medial pressure plate.

In one embodiment, the diaphragm 100 may be directly attached to the barrier curtain 12 so as to ensure that deflection of the barrier curtain correspondingly causes the diaphragm to be deflected by an equal amount and in the same direction. In the illustrated embodiment, for example, the medial pressure plate 102 may be attached to the barrier curtain 12, such as by adhesive or by one or more fasteners. Thus, although the medial pressure plate 102 of the illustrated embodiment is rigid, the medial pressure plate is configured to move with and be deflected with the barrier curtain 12 as a result of the flexibility provided by the annular bellows of the diaphragm 100.

The diaphragm 100 of the illustrated embodiment is configured to move in either of two opposite directions in response to pressure on the barrier curtain 12. Thus, in an instance in which a first side of the barrier curtain 12 is at a higher pressure than the second side of the barrier curtain, opposite the first side, the barrier curtain and the diaphragm 100 may be deflected in concert toward the second side. Conversely, in an instance in which the first side of the barrier curtain 12 is at a lower pressure than the second side of the barrier curtain, the barrier curtain and the diaphragm 100 may be deflected toward the first side. Thus, the cable release mechanism 90 of an embodiment of the present disclosure is responsive to a pressure differential acting upon the barrier curtain 12, regardless of which side of the barrier curtain is experiencing the higher pressure.

A cable release mechanism 90 includes a fixture 104 and an associated capture block 106 configured to releasably engage the first cable 26. In one embodiment, the first cable 26 includes first and second portions, each of which includes a cable fitting 108. In this embodiment, the cable release mechanism 90 is configured to engage the cable fittings 108 for the first and second portions of the first cable 26, at least until the barrier curtain 12 experiences at least a predetermined pressure differential. As shown in cross section in FIG. 10, the cable release mechanism 90 includes a fixture 104 that in combination with a capture block 106 defines an internal volume that is sized and shaped to receive the cable fittings 108 of the first and second portions of the first cable 26 and to prevent the cable fittings of the first and second portions of the first cable from being removed therefrom while the capture block remains in the engagement position, as shown in FIG. 10.

In the illustrated embodiment, the each cable fitting 108 of the first and second portions of the first cable 26 includes an angled exterior surface 110. Additionally, the capture block 106 of this embodiment includes correspondingly angled surfaces 112 configured to engage the angled exterior surfaces 110 of the cable fittings 108, thereby retaining the cable fittings of the first and second portions of the first cable 26 within the cable release mechanism 90 while the capture block is in the engagement position.

The capture block 106 may be held or otherwise maintained within the engagement position by a lever 114. In this regard, the lever 114 is operably connected to the diaphragm 100 for movement therewith. For example, a first end of the lever 114 may be attached to the medial pressure plate 102 of the diaphragm 100, as shown in FIGS. 9 and 10. Additionally, a second end of the lever 114, opposite the first end, may operably engage the capture block 106 in an instance in which the pressure differential that is placed upon the barrier curtain 12 is less than the predetermined pressure differential, thereby holding the capture block in the engagement position as shown in FIG. 10 such that the first and second portions of the first cable 26 are held in position or secured by the cable release mechanism 90. In one embodiment, the lever 114, such as the second end of the lever, may include a roller 116 for contacting the capture block 106 and facilitating relative movement of the second end of the lever with respect to the capture block, as described below.

The lever 114 of one embodiment is also pivotably connected to the first plate 92 of the cable release mechanism 90 so as to permit pivotal movement of the lever relative to the first plate. In one embodiment, the cable release mechanism 90 also includes an engagement mechanism that is configured to engage the lever 114 and prevent movement of the lever until at least the predetermined pressure differential has been placed upon the barrier curtain 12. While the cable release mechanism 90 may include various types of engagement mechanisms, the lever 114 of one embodiment defines a recess 118 including, for example, an opening therethrough, a dimple or the like, and the engagement mechanism includes a ball detent configured to engage the recess and to prevent movement of the lever until at least the predetermined pressure differential has been placed upon the barrier curtain 12. While the ball detent may be configured in various manners, the ball detent of one embodiment is shown in cross section in FIG. 10 and includes a housing 122 secured to a lug of the first plate by a pair of jam nuts 124. The housing 122 defines an interior cavity in which a spring 126 is disposed so as to spring load an engagement member 128 that engages the recess 118 defined by the lever 114. Based upon the spring force provided by the spring 126 and the position of the housing 122 (as defined, for example, by the threadable position of the jam nuts upon the housing) relative to the first plate 92 and, in turn, relative to the lever 114, the pressure differential that must be placed upon the barrier curtain 12 in order to overcome the engagement of the lever by the engagement mechanism and to permit movement of the lever and the release of the first cable 26 may be defined.

In an instance in which the pressure differential to which the barrier curtain 12 is subjected exceeds the predetermined pressure differential, such as established by the engagement of the lever 114 by the engagement member, the engagement member may be disengaged from the lever, and the lever may be permitted to pivot relative to the first plate 92 in response to deflection of the diaphragm 100 occasioned by the pressure differential to which the barrier curtain is subjected. In this embodiment, as shown in FIG. 11, the second end of the lever 114 moves as a result of the pivotal movement of the lever so as to no longer engage the capture block 106. As shown in FIG. 12, once the second end of the lever 114 no longer contacts the capture block 106, the capture block may be moved relative to the first plate 92, such as relative to the fitting 104 carried by the first plate, thereby releasing the first cable 26 and, more particularly, releasing the first and second portions of the first cable. The release of the first cable 26 by the cable release mechanism 90 permits the barrier curtain 12 to also be released, such as by being dropped, so as to equalize the pressure within the space that was previously divided by the barrier curtain 12.

In one embodiment, the first cable 26, such as the first and second portions of the first cable, are under tension. Thus, once the second end of the lever 114 is moved so as to no longer engage the capture block 106, the tension to which the first and second portions of the first cable 26 are subjected pulls the first and second portions of the first cable apart from one another. Consequently, the angled exterior surfaces 110 of the cable fittings 108 of the first and second portions of the first cable 26 apply an expansive force to the corresponding angled surfaces 112 of the capture block 106 that causes the capture block to be forced into a disengaged position with increased spacing relative to the fitting 104 defined by the first plate 92, thereby releasing the first and second portions of the first cable, as shown in FIG. 13.

As described above, the release of the first cable 26 by the cable release mechanism 90 of an embodiment of the present disclosure may be accomplished in a non-destructive manner. Thus, following the equalization of the pressure and after the cause of the pressure differential has been addressed, the first cable 26 and the barrier curtain 12 may be reinstalled, and the cable release mechanism 90 may be reused in order to again engage the first cable in such a manner that the barrier curtain at least partially environmentally isolates the volume.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An apparatus for at least partially environmentally isolating a volume, the apparatus comprising:
    a barrier curtain that partially defines the volume;
    a first cable extending along one or more walls that partially define the volume, wherein the barrier curtain is supported by the first cable; and
    a cable release mechanism attached to the barrier curtain and configured to engage the first cable, wherein the cable release mechanism comprises a diaphragm configured to be deflectable in response to a pressure differential being placed upon the barrier curtain such that the cable release mechanism releases the first cable in response to at least a predetermined pressure differential being placed upon the barrier curtain.

2. An apparatus according to claim 1 wherein the cable release mechanism further comprises:
    a lever operably connected to the diaphragm for movement therewith; and
    a capture block responsive to the lever and configured to be held in an engagement position by the lever so as to engage the first cable in an instance in which less than the predetermined pressure differential has been placed upon the barrier curtain, wherein the capture block is permitted to release the first cable in an instance in which the lever has moved in response to at least the predetermined pressure differential being placed upon the barrier curtain.

3. An apparatus according to claim 2 wherein the first cable includes first and second portions, and wherein the capture block is configured to engage the first and second portions of the first cable.

4. An apparatus according to claim 3 wherein the first and second portions of the first cable are under tension, wherein each of the first and second portions of the first cable comprise a cable fitting having an angled exterior surface, and wherein the capture block defines correspondingly angled surfaces configured to engage the angled exterior surfaces of the cable fittings of the first and second portions of the first cable while the capture block is held in the engagement position.

5. An apparatus according to claim 2 wherein the cable release mechanism further comprises a plate attached to the barrier curtain, and wherein the lever is pivotably connected to the plate.

6. An apparatus according to claim 2 wherein the cable release mechanism further comprises an engagement mechanism configured to engage the lever and to prevent movement of the lever until at least the predetermined pressure differential has been placed upon the barrier curtain.

7. An apparatus according to claim 6 wherein the lever defines a recess, and wherein the engagement mechanism comprises a ball detent configured to engage the recess and to prevent movement of the lever until at least the predetermined pressure differential has been placed upon the barrier curtain.

8. An apparatus according to claim 1 wherein the diaphragm comprises a flexible portion configured to be deflectable in response to a pressure differential being placed upon the barrier curtain.

9. A cable release mechanism comprising:
    a plate configured to be attached to a barrier curtain that is supported relative to one or more walls that at least partially define a volume by a first cable;
    a diaphragm carried by the plate and configured to be deflectable in response to a pressure differential being placed upon the barrier curtain;
    a lever operably connected to the diaphragm for movement therewith; and
    a capture block responsive to the lever and configured to be held in an engagement position by the lever so as to engage the first cable in an instance in which less than a predetermined pressure differential has been placed upon the barrier curtain, wherein the capture block is permitted to release the first cable in an instance in which the lever has moved in response to at least the predetermined pressure differential being placed upon the barrier curtain.

10. A cable release mechanism according to claim 9 wherein the first cable includes first and second portions, and wherein the capture block is configured to engage the first and second portions of the first cable.

11. A cable release mechanism according to claim 10 wherein the first and second portions of the first cable are under tension, wherein each of the first and second portions of the first cable comprise a cable fitting having an angled exterior surface, and wherein the capture block defines correspondingly angled surfaces configured to engage the angled exterior surfaces of the cable fittings of the first and second portions of the first cable while the capture block is held in the engagement position.

12. A cable release mechanism according to claim 9 wherein the lever is pivotably connected to the plate.

13. A cable release mechanism according to claim 9 further comprising an engagement mechanism configured to engage the lever and to prevent movement of the lever until at least the predetermined pressure differential has been placed upon the barrier curtain.

14. A cable release mechanism according to claim 13 wherein the lever defines a recess, and wherein the engagement mechanism comprises a ball detent configured to engage the recess and to prevent movement of the lever until at least the predetermined pressure differential has been placed upon the barrier curtain.

15. A cable release mechanism according to claim 9 wherein the diaphragm comprises a flexible portion configured to be deflectable in response to a pressure differential being placed upon the barrier curtain.

16. A cable release mechanism according to claim 9 wherein the lever comprises a roller configured to contact the capture block while the capture block is held in the engagement position.

17. A method for at least partially environmentally isolating a volume, the method comprising:
    releasably attaching a first cable to one or more walls that partially define the volume;

supporting a barrier curtain that partially defines the volume with the first cable;

engaging the first cable with a cable release mechanism that is attached to the barrier curtain and that includes a diaphragm; and causing the cable release mechanism to release the first cable in response to deflection of the diaphragm occasioned by at least a predetermined pressure differential being placed upon the barrier curtain.

18. A method according to claim 17 wherein the cable release mechanism further includes a lever operably connected to the diaphragm for movement therewith and a capture block responsive to the lever, wherein engaging the first cable with the cable release mechanism comprises engaging the first cable with the capture block in an instance in which less than the predetermined pressure differential has been placed upon the barrier curtain, and wherein causing the cable release mechanism to release the first cable comprises permitting the capture block to release the first cable in an instance in which the lever has moved in response to at least the predetermined pressure differential being placed upon the barrier curtain.

19. A method according to claim 18 wherein the first cable includes first and second portions, wherein engaging the first cable with the capture block comprises engaging the first and second portions of the first cable with the capture block.

20. A method according to claim 18 further comprising preventing movement of the lever until at least the predetermined pressure differential has been placed upon the barrier curtain.

* * * * *